United States Patent
Leong et al.

(10) Patent No.: US 8,269,440 B2
(45) Date of Patent: Sep. 18, 2012

(54) MOTOR SPEED CONTROL SYSTEM AND METHOD WITHOUT PULSE-WIDTH MODULATION

(75) Inventors: Foo Leng Leong, Singapore (SG); Edy Susanto, Singapore (SG); Ravishanker Krishnamoorthy, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 712 days.

(21) Appl. No.: 12/480,161

(22) Filed: Jun. 8, 2009

(65) Prior Publication Data

US 2010/0134055 A1 Jun. 3, 2010

Related U.S. Application Data

(60) Provisional application No. 61/118,820, filed on Dec. 1, 2008.

(51) Int. Cl.
*H02P 23/12* (2006.01)
(52) U.S. Cl. ............ 318/400.14; 318/400.34; 318/459; 318/484
(58) Field of Classification Search ............ 318/400.01, 318/400.1, 400.13, 400.14, 400.32, 400.34, 318/459, 484
See application file for complete search history.

(56) References Cited

U.S. PATENT DOCUMENTS

| | | | | |
|---|---|---|---|---|
| 4,070,606 | A * | 1/1978 | Morozumi et al. | 318/400.01 |
| 6,249,096 | B1 * | 6/2001 | Shin | 318/400.06 |
| 7,183,734 | B2 * | 2/2007 | Lassen | 318/400.34 |
| 7,514,888 | B2 * | 4/2009 | Bakker et al. | 318/400.34 |
| 8,084,970 | B2 * | 12/2011 | Mullin et al. | 318/400.11 |

OTHER PUBLICATIONS

Brushless DC Electric Motor; Wikipedia, the free encyclopedia; http://en.wikipedia.org/wiki/Brushless_DC_electric_motor; Apr. 29, 2009; 6 pages.

* cited by examiner

*Primary Examiner* — Walter Benson
*Assistant Examiner* — Thai Dinh (57) ABSTRACT

A motor control system includes a power control module and a detection module. The power control module controls power applied to first and second stator coils of a motor to rotate a rotor. The rotor induces voltages in the first and second stator coils when the rotor is rotating. The detection module determines a first time when a first voltage is induced in the first stator coil and determines a second time when a second voltage is induced in the second stator coil after the first voltage is induced. The detection module determines a speed of the rotor based on a difference between the first and second time. The power control module applies current through the second stator coil a predetermined period after the second time. The power control module determines the predetermined period based on the speed of the rotor.

26 Claims, 8 Drawing Sheets

Driving Rotor Using Pulse-Width Modulation

MOTOR SPEED CONTROL SYSTEM AND METHOD WITHOUT PULSE-WIDTH MODULATION

CROSS-REFERENCE TO RELATED APPLICATIONS

This application claims the benefit of U.S. Provisional Application No. 61/118,820, filed on Dec. 1, 2008. The disclosure of the above application is incorporated herein by reference in its entirety.

FIELD

The present disclosure relates to electric motor control, and more particularly to adjusting the speed of an electric motor based on voltages induced in stator coils of the electric motor.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cooling fan assemblies may provide airflow to dissipate heat generated by electronic components. Cooling fan assemblies may include a motor that drives fan blades via a rotor. The speed of the rotor may be adjusted to adjust airflow and heat dissipation.

Figure 1:
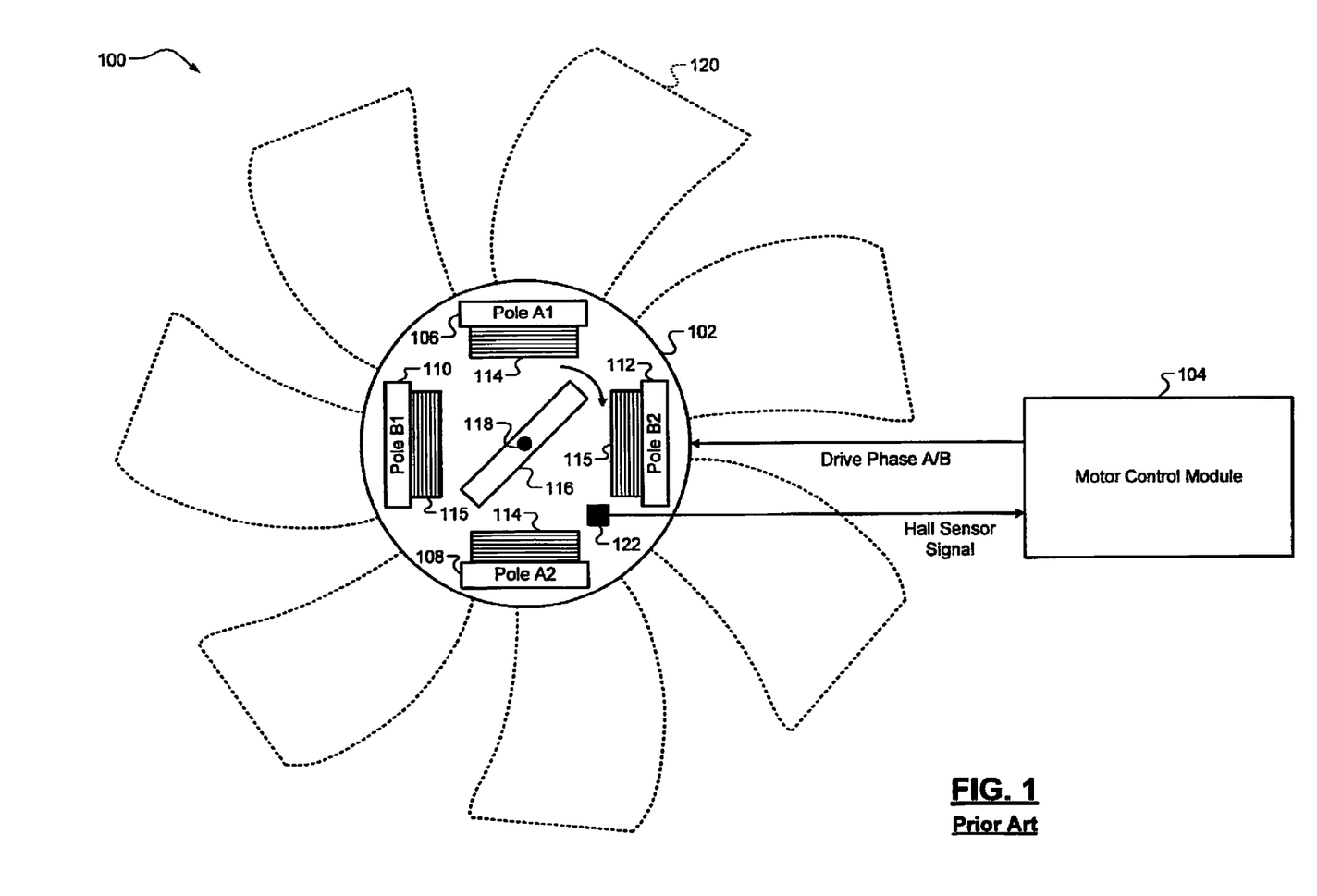
FIG. 1 is a cooling fan system.

Referring now to FIG. 1, a cooling fan system 100 includes a motor 102 and a motor control module 104. The motor 102 may include a two-phase brushless direct current (DC) motor. The motor 102 may include four stator poles: pole A1 106, pole A2 108, pole B1 110, and pole B2 112. Pole A1 106 and pole A2 108 may collectively be called "pole pair A." Pole pair A may be wound with a stator coil 114 (hereinafter "coil A 114"). Pole B1 110 and pole B2 112 may collectively be called "pole pair B." Pole Pair B may be wound with a stator coil 115 (hereinafter "coil B 115"). The motor control module 104 may apply a voltage and/or current to coil A 114 to generate a magnetic field between pole A1 106 and pole A2 108. Applying the voltage and/or current to coil A 114 may be called "driving phase A." The motor control module 104 may apply the voltage and/or current to coil B 115 to generate a magnetic field between pole B1 110 and pole B2 112. Applying the voltage and/or current to coil B 115 may be called "driving phase B."

The motor 102 includes a rotor 116. The rotor 116 may include at least one permanent magnet. The motor control module 104 may drive phase A and/or phase B to actuate the rotor 116 about an axle 118. The axle 118 may mechanically couple the rotor 116 to a device. For example, the axle 118 may mechanically couple the rotor 116 to a fan 120 used to cool electronic components. While the rotor 116 in FIG. 1 rotates between the stator poles 106, 108, 110, 112, the motor 102 may include a rotor that surrounds the stator poles 106, 108, 110, 112.

The motor control module 104 may alternate between driving phase A and driving phase B to actuate the rotor 116. The motor control module 104 may drive phase A twice and drive phase B twice to rotate the rotor 116 one revolution. For example, the motor control module 104 may drive phase A, then drive phase B, then drive phase A, then drive phase B to rotate the rotor 116 one revolution.

The motor 102 may include at least one Hall-effect sensor 122 that indicates rotation of the rotor 116. For example, the Hall-effect sensor 122 may generate a pulse when a magnetic pole of the rotor 116 passes the Hall-effect sensor 122. The motor control module 104 may determine a rotational speed of the rotor 116 based on the pulses from the Hall-effect sensor 122.

Figure 2A:
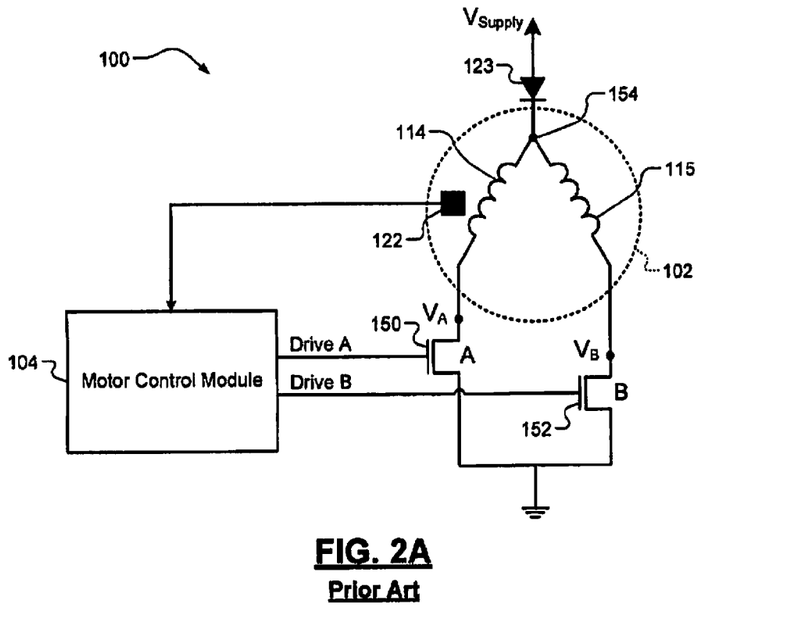
FIG. 2A is a cooling fan system that includes driving transistors.

Referring now to FIG. 2A, the motor 102 may be connected to a power supply that provides a power supply voltage ($V_{supply}$). $V_{supply}$ may be connected to a common termination 154 (hereinafter "center tap 154") of coil A 114 and coil B 115 via a diode 123. The diode 123 may protect against reverse voltage.

Transistor A 150 may connect coil A 114 to ground when a voltage is applied to a gate of transistor A 150. The power supply may provide current through coil A 114 when transistor A 150 connects coil A 114 to ground. Accordingly, the motor control module 104 may apply a voltage to transistor A 150 to drive phase A. Node voltage $V_A$ may be near ground when the motor control module 104 drives phase A.

Transistor B 152 may connect coil B 115 to ground when a voltage is applied to a gate of transistor B 152. The power supply may provide current through coil B 115 when transistor B 152 connects coil B 115 to ground. Accordingly, the motor control module 104 may apply a voltage to transistor B 152 to drive phase B. Node voltage $V_B$ may be near ground when the motor control module 104 drives phase B.

The motor control module 104 may reduce the voltage applied to transistor A 150 to turn off transistor A 150. Current may not flow through coil A 114 when transistor A 150 is turned off. The motor control module 104 may reduce the voltage applied to transistor B 152 to turn off transistor B 152. Current may not flow through coil B 115 when transistor B 152 is turned off.

Figure 2B:
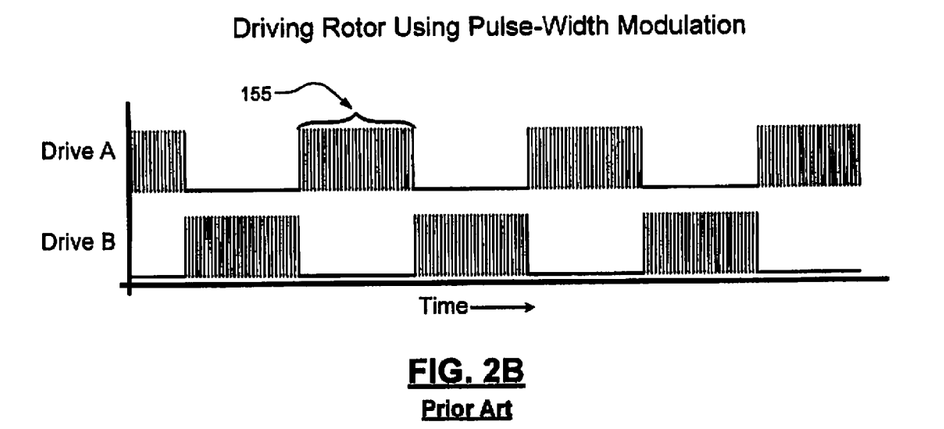
FIG. 2B illustrates signals generated at terminals of a motor when a rotor is driven using pulse-width modulation driving signals.

Referring now to FIG. 2B, the graph illustrates driving phase A and driving phase B based on signals from the Hall-effect sensor 122. The motor control module 104 may drive the motor 102 using pulse-width modulation (PWM) driving signals when the speed of the rotor 116 is less than full speed. The PWM driving signals may include a series of driving pulses as illustrated at 155. The motor control module 104 may control a duty cycle of the driving pulses to control the speed of the rotor 116.

SUMMARY

A motor control system comprises a power control module and a detection module. The power control module controls power applied to first and second stator coils of a motor to rotate a rotor. The rotor induces voltages in the first and second stator coils when the rotor is rotating. The detection module determines a first time when a first voltage is induced in the first stator coil and determines a second time when a second voltage is induced in the second stator coil after the first voltage is induced. The detection module determines a speed of the rotor based on a difference between the first and second time. The power control module applies current through the second stator coil a predetermined period after the second time. The power control module determines the predetermined period based on the speed of the rotor.

In other features, the motor is a two-phase brushless direct current motor.

In other features, the detection module determines the first voltage is induced in the first stator coil when a voltage across the first stator coil is less than or equal to a first predetermined voltage. The detection module determines the second voltage is induced in the second stator coil when a voltage across the second stator coil is less than or equal to a second predetermined voltage.

In other features, the power control module determines the predetermined period based on a predefined speed.

In other features, the power control module increases a length of the predetermined period to decrease the speed of the rotor when the predefined speed is less than the speed of the rotor.

In other features, the power control module decreases a length of the predetermined period to increase the speed of the rotor when the predefined speed is greater than the speed of the rotor.

In other features, the power control module sets the predetermined period equal to zero and applies current through the second stator coil at the second time.

In other features, the power control module stops applying current through the second stator coil in response to a third voltage that is induced in the first coil after applying current through the second stator coil.

In other features, the detection module determines an updated speed of the rotor based on a period between the second time and when the third voltage is induced in the first coil.

In other features, the power control module applies current through the first coil an updated period after the third voltage is induced, wherein the updated period is based on the updated speed of the rotor.

In other features, the power control module stops applying current through the first coil in response to a fourth voltage that is induced in the second coil after the power control module applies current through the first coil.

In other features, the power control module applies current through the first stator coil during the predetermined period to rotate the rotor.

In other features, the power control module applies current through the first stator coil during the predetermined period to maintain the speed of the rotor.

In still other features, a method comprises controlling power applied to first and second stator coils of a motor to rotate a rotor, wherein the rotor induces voltages in the first and second stator coils when the rotor is rotating. The method further comprises determining a first time when a first voltage is induced in the first stator coil, determining a second time when a second voltage is induced in the second stator coil after the first voltage is induced, and determining a speed of the rotor based on a difference between the first and second time. The method further comprises applying current through the second stator coil a predetermined period after the second time. Additionally, the method comprises determining the predetermined period based on the speed of the rotor.

In other features, the method comprises controlling power applied to first and second stator coils of a two-phase brushless direct current motor.

In other features, the method comprises determining the first voltage is induced in the first stator coil when a voltage across the first stator coil is less than or equal to a first predetermined voltage. The method further comprises determining the second voltage is induced in the second stator coil when a voltage across the second stator coil is less than or equal to a second predetermined voltage.

In other features, the method comprises determining the predetermined period based on a predefined speed.

In other features, the method comprises increasing a length of the predetermined period to decrease the speed of the rotor when the predefined speed is less than the speed of the rotor.

In other features, the method comprises decreasing a length of the predetermined period to increase the speed of the rotor when the predefined speed is greater than the speed of the rotor.

In other features, the method comprises setting the predetermined period equal to zero and applying current through the second stator coil at the second time.

In other features, the method comprises stopping current through the second stator coil in response to a third voltage that is induced in the first coil after applying current through the second stator coil.

In other features, the method comprises determining an updated speed of the rotor based on a period between the second time and when the third voltage is induced in the first coil.

In other features, the method comprises applying current through the first coil an updated period after the third voltage is induced, wherein the updated period is based on the updated speed of the rotor.

In other features, the method comprises stopping current through the first coil in response to a fourth voltage that is induced in the second coil after the power control module applies current through the first coil.

In other features, the method comprises applying current through the first stator coil during the predetermined period to rotate the rotor.

In other features, the method comprises applying current through the first stator coil during the predetermined period to maintain the speed of the rotor.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Motors used in fan assemblies typically include at least one Hall-effect sensor to detect the speed of the rotor. Hall-effect sensors, however, increase the cost of the motor. Additionally, Hall-effect sensors may fail, thereby reducing the reliability of the motor.

Accordingly, a speed control system of the present disclosure determines the speed of the rotor without using the Hall-effect sensor. The speed control system may determine the speed of the rotor based on voltages induced in stator coils of the motor. For example, the speed control system may determine the speed of the rotor based on a period of time between voltages induced on the stator coils. Elimination of the Hall-effect sensor may reduce a number of components included in the electric motor, and therefore may reduce the cost of the motor and increase the reliability of the motor.

Motors including Hall-effect sensors are typically controlled using pulse-width modulation (PWM) driving signals. PWM driving signals may generate electrical noise that interferes with other electrical signals in a fan system. PWM driving signals may also introduce energy losses in the fan system.

In one embodiment of the present invention, the speed control system drives each phase of the motor using a constant driving signal instead of using PWM driving signals. The speed control system may apply the constant driving signal to a phase of the motor after detecting an induced voltage on the phase. For example, the speed control system may apply current to a stator coil of the motor a delay period after detecting an induced voltage on the stator coil. The speed control system may determine the delay period based on the speed of the rotor.

Figure 3:
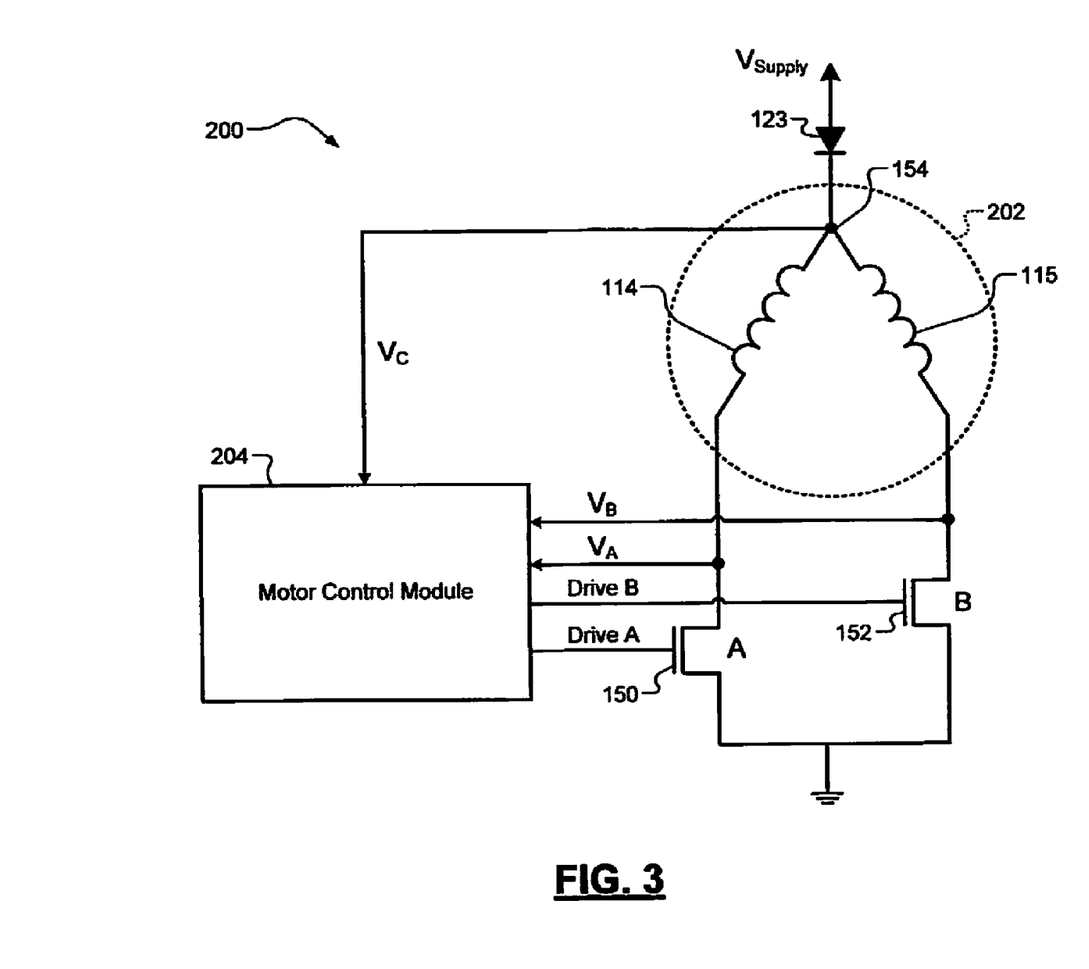
FIG. 3 is a motor system according to the present disclosure.

Referring now to FIG. 3, an exemplary motor system 200 according to the present disclosure includes a motor 202 and a motor control module 204. For example only, the motor 202 may include a two-phase brushless DC motor. While the speed control system is described as controlling the two-phase brushless DC motor, the speed control system may also control other motor systems (e.g., three-phase motor systems).

The motor control module 204 may drive phase A and/or phase B of the motor 202. The motor control module 204 may measure $V_A$ and $V_B$. The motor control module 204 may also measure a voltage at the center tap 154 (hereinafter "$V_c$") of the motor 202. The motor control module 204 may drive phases A and B based on $V_A$, $V_B$, and $V_c$.

The power supply voltage ($V_{supply}$) may connect to the center tap 154 via the diode 123. Accordingly, $V_c$ may be approximately a diode voltage drop below $V_{supply}$. In some implementations, the motor system 200 may not include the diode 123. The motor control module 204 may control transistors A and B 150, 152 to drive phases A and B, respectively. While transistors A and B 150, 152 are illustrated and described as n-channel metal-oxide-semiconductor field-effect transistors, the motor system 200 may implement the speed control system using other transistors and/or switches that provide similar functionality.

Transistors A and B 150, 152 may be referred to hereinafter as switches A and B 150, 152, respectively. Current may flow through coil A 114 to ground when the motor control module 204 closes switch A 150. Current may flow through coil B 115 to ground when the motor control module 204 closes switch B 152. Accordingly, the motor control module 204 may close switches A and B 150, 152 to drive phases A and B, respectively. Current may be restricted from flowing through coil A 114 when the motor control module 204 opens switch A 150. Current may be restricted from flowing through coil B 115 when the motor control module 204 opens switch B 152.

Figure 4:
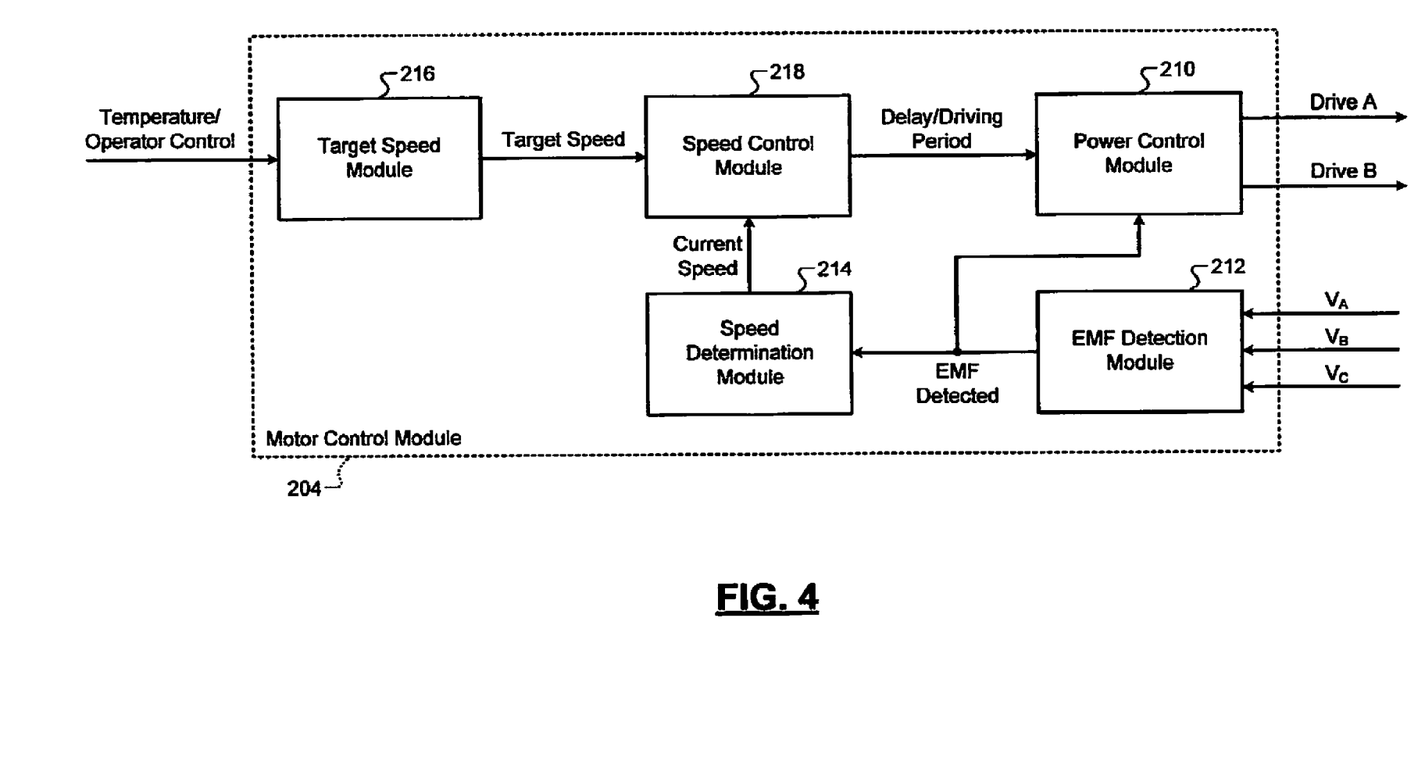
FIG. 4 is a motor control module according to the present disclosure.

Referring now to FIG. 4, the motor control module 204 may implement a feedback system that adjusts the speed of the rotor 116 to reach a target speed. The motor control module 204 may adjust the speed of the rotor 116 based on a difference between a current speed of the rotor 116 and the target speed. For example, when the current speed is less than the target speed, the motor control module 204 may increase the speed of the rotor 116 to achieve the target speed. When the current speed is greater than the target speed, the motor control module 204 may decrease the speed of the rotor 116 to achieve the target speed.

The motor control module 204 includes a power control module 210, an electromotive force (EMF) detection module 212, a speed determination module 214, a target speed module 216, and a speed control module 218. The power control module 210 may drive phase A and/or phase B to adjust the speed of the rotor 116. The EMF detection module 212 measures voltages induced in coil A 114 and coil B 115 when the rotor 116 is rotating. The speed determination module 214 determines the current speed of the rotor 116 based on the voltages induced in coil A 114 and coil B 115. The target speed module 216 may generate the target speed based on a speed requested by an operator and/or electronic controller. The speed control module 218 instructs the power control module 210 to drive phase A and/or phase B based on the current speed and the target speed.

Generally, the power control module 210 drives phases A and B separately to rotate the rotor 116. For example, the power control module 210 may open switch B 152 when the power control module 210 closes switch A 150. Additionally, the power control module 210 may open switch A 150 when the power control module 210 closes switch B 152.

The rotor 116 may induce an EMF (hereinafter "induced EMF") in coil A 114 and/or coil B 115 when the rotor 116 is rotating. The EMF detection module 212 may detect the induced EMF based on $V_A$, $V_B$, and $V_c$. The EMF detection module 212 may detect the induced EMF in coil A 114 based on a comparison of $V_A$ and $V_c$. For example the EMF detection module 212 may detect the induced EMF in coil A 114 when $V_A$ transitions from a value greater than $V_c$ to a value less than $V_c$. The EMF detection module 212 may detect the induced EMF in coil B 115 based on a comparison of $V_B$ and $V_c$. For example, the EMF detection module 212 may detect the induced EMF in coil B 115 when $V_B$ transitions from a value greater than $V_c$ to a value less than $V_c$.

The power control module 210 may drive phases A and B based on the induced EMF. For example, the power control module 210 may switch from driving phase A to driving phase B when the EMF detection module 212 detects the induced EMF in coil B 115. Additionally, the power control module 210 may switch from driving phase B to driving phase A when the EMF detection module 212 detects the induced EMF in coil A 114.

The speed determination module 214 may determine the current speed based on an amount of time between consecutive detections of induced EMF. The amount of time between consecutive detections of induced EMF may be referred to hereinafter as an "EMF detection period." For example, the speed determination module 214 may determine the EMF detection period based on the detection of induced EMF in coil A 114 followed by the induced EMF in coil B 115. Additionally, in some implementations, the speed determination module 214 may determine the EMF detection period based on the detection of consecutive induced EMFs in the same coil. For example, the speed determination module 214 may determine the EMF detection period based on detection of consecutive induced EMFs in coil A 114.

The speed control module 218 may instruct the power control module 210 to drive phase A and/or phase B based on a difference between the current speed and the target speed. The speed control module 218 may instruct the power control module 210 to increase the speed of the rotor 116 when the target speed is less than the current speed. The speed control module 218 may instruct the power control module 210 to decrease the speed of the rotor 116 when the target speed is less than the current speed.

The target speed module 216 may generate the target speed based on the speed requested by the operator and/or electronic controller. The operator may request the target speed using a switch. For example, the operator may use the switch to select from a range of speeds. The electronic controller may request the target speed based on sensed ambient temperature. For example, when the rotor 116 drives a fan blade, the electronic controller may request an increase in the target speed when the ambient temperature increases. Accordingly, the increase in the target speed may result in an increased airflow that cools components connected to the motor system 200.

Figure 5:
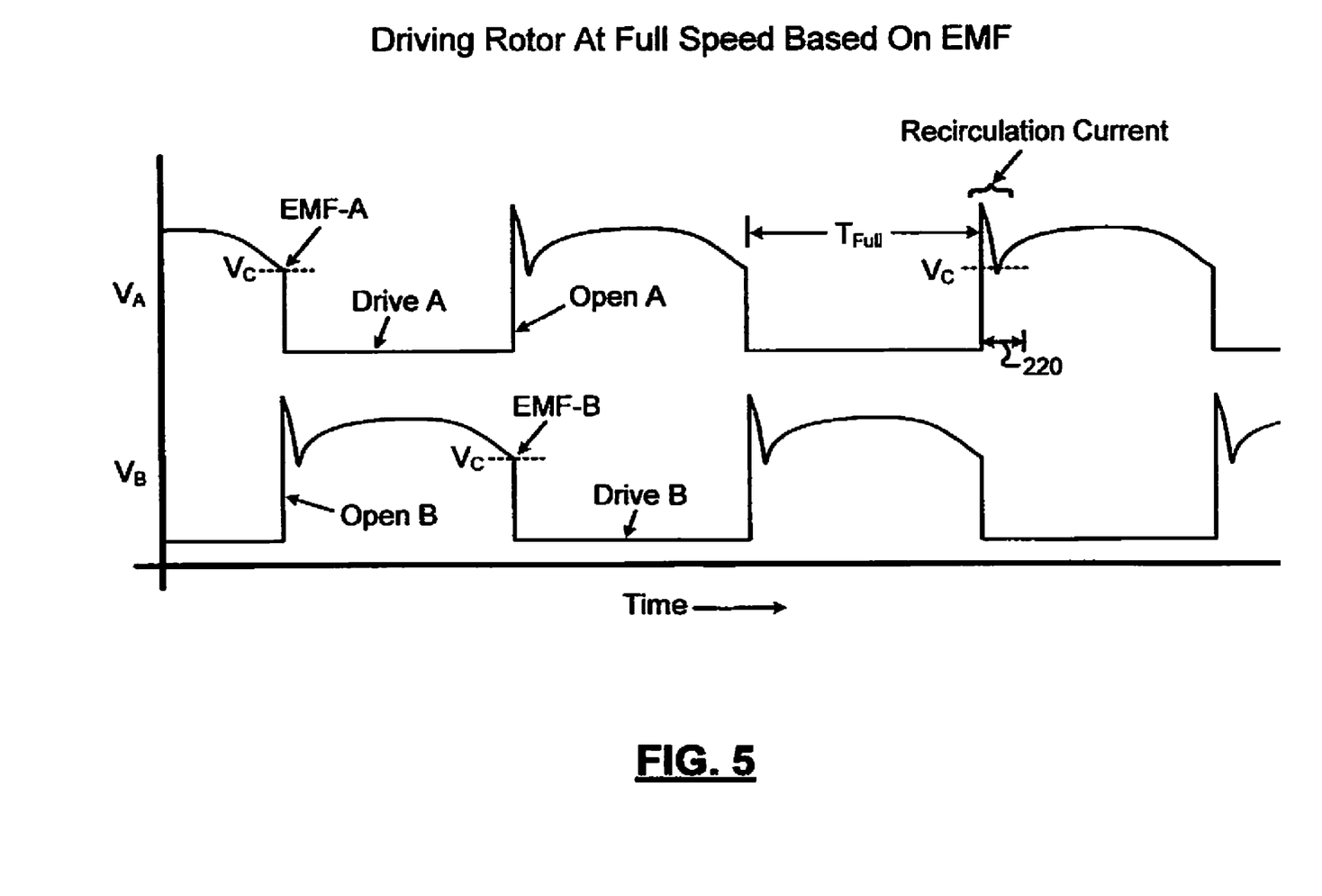
FIG. 5 is a graph that illustrates driving the rotor at full speed based on voltages induced in stator coils of the motor.

Referring now to FIG. 5, the graph illustrates $V_A$, $V_B$, and $V_c$ measured when the rotor 116 is driven at full speed based on induced EMF. The graph of FIG. 5 may illustrate $V_A$ and $V_B$ when the rotor 116 is maintained at full speed for consecutive EMF detection periods. The full speed obtained by the rotor 116 may depend on electrical and mechanical parameters of the motor 202. For example only, the full speed of the rotor 116 may include 3000-4000 RPM.

$V_A$ and $V_B$ may be low when the power control module 210 drives phases A and B, respectively. $V_A$ and $V_B$ may be floating when the power control module 210 opens switches A and B 150, 152, respectively. Accordingly, $V_A$ and $V_B$ may vary due to transient current fluctuations in the stator coils 114, 115 when the power control module 210 opens switches A and B 150, 152. The transient current fluctuations in the stator coils 114, 115 may be due to 1) transient current transfer between the coils 114, 115 and 2) induced EMF in the coils 114, 115 due to rotation of the rotor 116.

The power control module 210 alternates between driving phase A and driving phase B based on detection of the induced EMF. For example, the power control module 210 may drive phase A until the induced EMF is detected at $V_B$. The power control module 210 may open switch A 150 and drive phase B when the induced EMF is detected at $V_B$. The power control module 210 may drive phase B until the induced EMF is detected at $V_A$. The power control module 210 may open switch B 152 and drive phase A when the induced EMF is detected at $V_A$.

The EMF detection module 212 measures $V_A$ when the power control module 210 drives phase B. The EMF detection module 212 may detect the induced EMF when $V_A$ decreases below $V_c$, indicated at EMF-A. The power control module 210 may open switch B 152 when the EMF detection module 212 detects the induced EMF at $V_A$. The power control module 210 switches from driving phase B to driving phase A when the EMF detection module 212 detects the induced EMF at $V_A$.

The EMF detection module 212 measures $V_B$ when the power control module 210 drives phase A. The EMF detection module 212 may detect the induced EMF when $V_B$ decreases below $V_c$, indicated at EMF-B. The power control module 210 may open switch A 150 when the EMF detection module 212 detects the induced EMF at $V_B$. The power control module 210 switches from driving phase A to driving phase B when the EMF detection module 212 detects the induced EMF at $V_B$.

The speed determination module 214 may determine the EMF detection period based on an amount of time between detection of the induced EMF at $V_A$ and $V_B$. For example, the speed determination module 214 may determine the EMF detection period ($T_{Full}$) when the rotor 116 is rotated at full speed. Four EMF detection periods may correspond to one revolution of the rotor 116. Accordingly, the speed determination module 214 may determine the current speed of the rotor 116 is $(4 \times T_{Full})^{-1}$ revolutions per second when the EMF detection period is equal to $T_{Full}$. The length of the EMF detection period may increase as the current speed of the rotor 116 decreases.

A recirculation current may arise when the power control module 210 opens the switches 150, 152. For example, the recirculation current may arise when the power control module 210 opens switch A 150 while closing switch B 152. The recirculation current may be caused by opening switch A 150 while current is flowing through coil A 114.

In some implementations, the recirculation current may cause $V_A$ to momentarily drop below $V_c$. The EMF detection module 212 typically detects the induced EMF when $V_A$ drops below $V_c$, however the recirculation current may not be indicative of the induced EMF. Therefore, the EMF detection module 212 may delay detection of the induced EMF at $V_A$ for a recirculation period after opening switch A 150. The recirculation period is illustrated at 220. Delaying detection of the induced EMF for the recirculation period may allow the EMF detection module 212 to avoid determining that the recirculation current is the induced EMF. The EMF detection module 212 may determine the recirculation period based on a percentage of the EMF detection period preceding the recirculation current. For example only, the EMF detection module 212 may determine the recirculation period is 10% of the EMF detection period $T_{Full}$.

Figure 6:
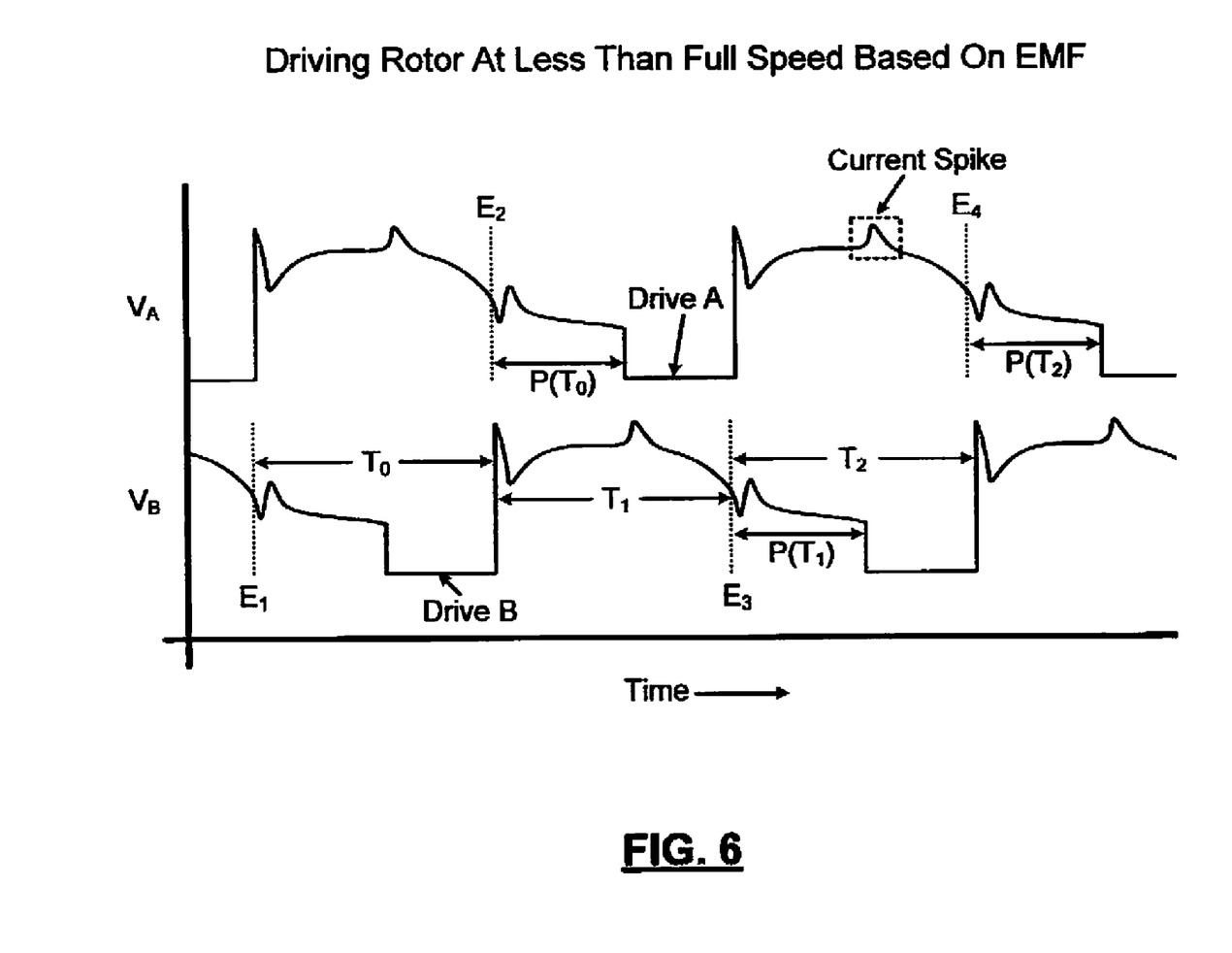
FIG. 6 is a graph that illustrates driving the rotor at less than full speed based on the voltages induced in the stator coils of the motor.

Referring now to FIG. 6, the graph illustrates $V_A$ and $V_B$ measured when the rotor 116 is driven at less than full speed based on induced EMF. The speed control module 218 may determine a delay period based on a difference between the current speed and the target speed when the rotor 116 is driven at less than full speed. The delay period may be an amount of time the power control module 210 waits before driving phases A and B after detection of the induced EMF at $V_A$ and $V_B$, respectively. For example, the power control module 210 may wait for the delay period before driving phase A after detection of the induced EMF at $V_A$. The power control module 210 also may wait for the delay period before driving phase B after detection of the induced EMF at $V_B$.

Detection of the induced EMFs are illustrated as $E_1$, $E_2$, $E_3$, and $E_4$. The speed determination module 214 determines the EMF detection periods $T_0$, $T_1$, and $T_2$ based on the differences $E_2$-$E_1$, $E_3$-$E_2$, and $E_4$-$E_3$, respectively. The delay periods are illustrated as $P(T_0)$, $P(T_1)$, and $P(T_2)$. The delay periods $P(T_0)$, $P(T_1)$, and $P(T_2)$ may be based on the current speeds determined from the EMF detection periods $T_0$, $T_1$, and $T_2$, respectively.

Generally, increasing a length of the delay period decreases the speed of the rotor 116. Accordingly, the speed control module 218 may increase the delay period when the target speed is less than the current speed. The speed control module 218 may decrease the delay period when the target speed is greater than the current speed of the rotor 116. The speed of the rotor 116 may approach full speed when the delay period approaches zero. Accordingly, $V_A$ and $V_B$ illustrated in FIG. 5 may represent an implementation of the speed control system when the delay period equals zero.

The speed control system as illustrated in FIG. 6 will now be discussed. The EMF detection module 212 may detect the induced EMF at $V_B$ ($E_1$) followed by the induced EMF at $V_A$ ($E_2$). The speed determination module 214 may determine the EMF detection period $T_0$ based on the difference between $E_2$ and $E_1$ when $E_2$ is detected. The power control module 210 may open switch B 152 when $E_2$ is detected. The speed determination module 214 may determine the current speed based on $T_0$. The speed control module 218 may determine the delay period $P(T_0)$ based on the current speed and the target speed. The power control module 210 may close switch A 150 after waiting for the delay period $P(T_0)$.

A current spike may arise at $V_B$ when the power control module 210 closes switch A 150. The EMF detection module 212 may disregard the current spike since the current spike may not be indicative of induced EMF. Recirculation currents may arise when the power control module 210 opens the switches 150, 152. Accordingly, the EMF detection module 212 may implement the recirculation period when the speed of the rotor 116 is less than full speed.

The EMF detection module 212 measures $V_B$ when the power control module 210 drives phase A. The EMF detection module 212 detects the induced EMF when $V_B$ decreases below $V_c$, as illustrated at $E_3$. The power control module 210 opens switch A 150 when the EMF detection module 212 detects the induced EMF at $E_3$. The speed determination module 214 determines the current speed based on the EMF period ($T_1$) when the EMF detection module 212 detects the induced EMF at $E_3$. The speed control module 218 determines the delay period $P(T_1)$ based on $T_1$. The power control module 210 closes switch B 152 after the delay period $P(T_1)$.

When the current speed based on $T_1$ is equal to the target speed, the speed control module 218 may set delay period $P(T_1)$ equal to the delay period $P(T_0)$ to maintain the current speed. When the current speed based on $T_1$ is greater than the target speed, the speed control module 218 may generate the delay period $P(T_1)$ that is greater than $P(T_0)$ to decrease the speed of the rotor 116. When the current speed based on $T_1$ is less than the target speed, the speed control module 218 may generate a delay period $P(T_1)$ that is less than $P(T_0)$ to increase the speed of the rotor 116.

While the description of FIG. 6 describes the speed control system as initiating a speed change by driving phase A based on $T_0$ when induced EMF $E_2$ is detected, the speed control system may initiate the speed change at a later time. For example, the speed control system may drive phase A to maintain period $T_1$ equal to $T_0$, then initiate the speed change by driving phase B based on $T_0$ when induced EMF $E_3$ is detected.

In an alternative implementation of the speed control system, the power control module 210 may drive phase A when the induced EMF is detected at $V_A$ instead of leaving switch A 150 open. The speed control system may also drive phase B when the induced EMF is detected at $V_B$ instead of leaving switch B 152 open.

In the alternative implementation, the speed control module 218 may determine a driving period based on a difference between the current speed and the target speed. The driving period may be an amount of time the power control module 210 drives phases A and B after detection of the induced EMF at $V_A$ and $V_B$, respectively.

For example, the power control module 210 may drive phase A for the driving period when the induced EMF is detected at $V_A$. The power control module 210 may open switch A 150 after the driving period. The speed control module 218 may update the driving period when the induced EMF is detected at $V_B$. The power control module 210 may then drive phase B for the updated driving period when the induced EMF is detected at phase B. Subsequently, the power control module 210 may open switch B 152 after the updated driving period.

Figure 7:
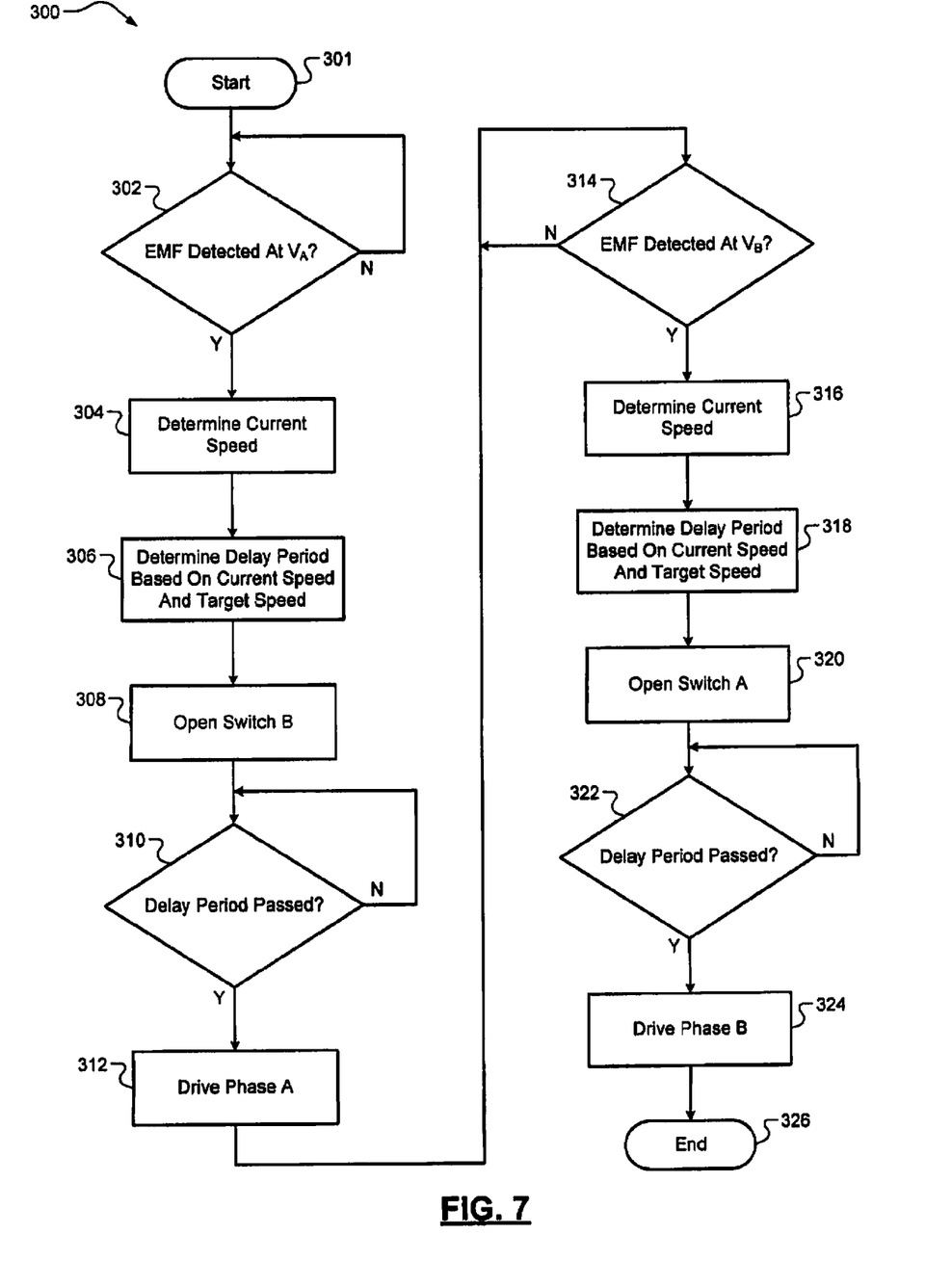
FIG. 7 illustrates a first method for controlling a speed of the rotor.

Referring now to FIG. 7, a first method 300 for controlling the speed of the rotor starts at 301. At 302, the EMF detection module 212 determines whether the induced EMF is detected at $V_A$. If the result of 302 is false, the method 300 repeats 302. If the result at 302 is true, the method 300 continues at 304. At 304, the speed determination module 214 determines the current speed of the rotor 116. At 306, the speed control module 218 determines the delay period based on the current speed and the target speed. At 308, the power control module 210 opens switch B 152.

At 310, the power control module 210 determines whether the delay period has passed. If the result of 310 is false, the method 300 repeats 310. If the result of 310 is true, the method 300 continues with at 312. At 312, the power control module 210 drives phase A. At 314, the EMF detection module 212 determines whether the induced EMF is detected at $V_B$. If the result of 314 is false, the method 300 repeats 314. If the result of 314 is true, the method 300 continues with at 316.

At 316, the speed determination module 214 determines the current speed of the rotor 116. At 318, the speed control module 218 determines the delay period based on the current speed and the target speed. At 320, the power control module 210 opens switch A 150. At 322, the power control module 210 determines whether the delay period has passed. If the result of at 322 is false, the method 300 repeats 322. If the result at 322 is true, the method 300 continues at 324. At 324, the power control module 210 drives phase B. The method 300 ends at 326.

Figure 8:
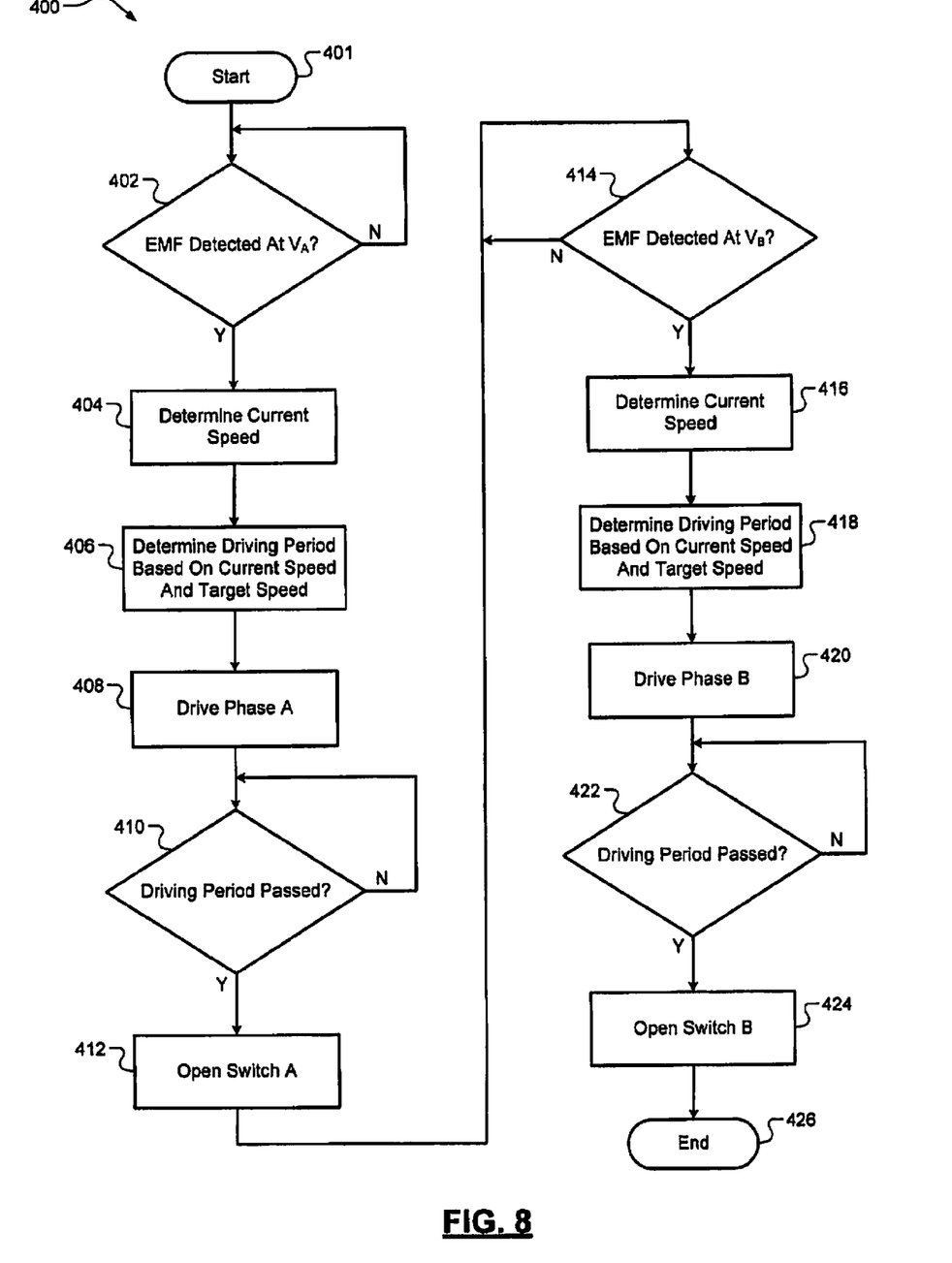
FIG. 8 illustrates a second method for controlling the speed of the rotor.

Referring now to FIG. 8, a second method 400 for controlling the speed of the rotor starts at 401. At 402, the EMF detection module 212 determines whether the induced EMF is detected at $V_A$. If the result at 402 is false, the method 400 repeats 402. If the result at 402 is true, the method 400 continues at 404. At 404, the speed determination module 214 determines the current speed of the rotor 116. At 406, the speed control module 218 determines the driving period based on the current speed and the target speed. At 408, the power control module 210 drives phase A.

At 410, the power control module 210 determines whether the driving period has passed. If the result at 410 is false, the method 400 repeats 410. If the result at 410 is true, the method 400 continues at 412. At 412, the power control module 210 opens switch A 150. At 414, the EMF detection module 212 determines whether the induced EMF is detected at $V_B$. If the result at 414 is false, the method 400 repeats 414. If the result at 414 is true, the method 400 continues at 416.

At 416, the speed determination module 214 determines the current speed of the rotor 116. At 418, the speed control module 218 determines the driving period based on the current speed and the target speed. At 420, the power control module 210 drives phase B. At 422, the power control module 210 determines whether the driving period has passed. If the result at 422 is false, the method 400 repeats 422. If the result at 422 is true, the method 400 continues with at 424. At 424, the power control module 210 opens switch B 152. The method 400 ends at 426.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A motor control system comprising:
   a power control module that controls power applied to a first stator coil and a second stator coil of a motor to rotate a rotor, wherein the rotor induces voltages in the first stator coil and the second stator coil when the rotor is rotating; and
   a detection module that i) determines a first time when a first voltage is induced in the first stator coil, ii) determines a second time when a second voltage is induced in the second stator coil after the first voltage is induced, and iii) determines a speed of the rotor based on a difference between the first time and the second time,
   wherein the power control module applies current through the second stator coil a predetermined period after the second time, and wherein the power control module determines the predetermined period based on the speed of the rotor.

2. The motor control system of claim 1, wherein the motor is a two-phase brushless direct current motor.

3. The motor control system of claim 1, wherein the detection module:
   determines the first voltage is induced in the first stator coil when a voltage across the first stator coil is less than or equal to a first predetermined voltage; and
   determines the second voltage is induced in the second stator coil when a voltage across the second stator coil is less than or equal to a second predetermined voltage.

4. The motor control system of claim 1, wherein the power control module determines the predetermined period based on a predefined speed.

5. The motor control system of claim 4, wherein when the predefined speed is less than the speed of the rotor, the power control module increases a length of the predetermined period to decrease the speed of the rotor.

6. The motor control system of claim 4, wherein when the predefined speed is greater than the speed of the rotor, the power control module decreases a length of the predetermined period to increase the speed of the rotor.

7. The motor control system of claim 1, wherein the power control module sets the predetermined period equal to zero, and wherein the power control module applies current through the second stator coil at the second time.

8. The motor control system of claim 1, wherein after applying current through the second stator coil, the power control module stops applying current through the second stator coil in response to a third voltage that is induced in the first coil.

9. The motor control system of claim 8, wherein the detection module determines an updated speed of the rotor based on a period between the second time and when the third voltage is induced in the first coil.

10. The motor control system of claim 9, wherein the power control module applies current through the first coil an updated period after the third voltage is induced, and wherein the updated period is based on the updated speed of the rotor.

11. The motor control system of claim 10, wherein after the power control module applies current through the first coil, the power control module stops applying current through the first coil in response to a fourth voltage that is induced in the second coil.

12. The motor control system of claim 1, wherein the power control module applies current through the first stator coil during the predetermined period to rotate the rotor.

13. The motor control system of claim 12, wherein the power control module applies current through the first stator coil during the predetermined period to maintain the speed of the rotor.

14. A method comprising:
   controlling power applied to a first stator coil and a second stator coil of a motor to rotate a rotor, wherein the rotor induces voltages in the first stator coil and the second stator coil when the rotor is rotating;
   determining a first time when a first voltage is induced in the first stator coil;
   determining a second time when a second voltage is induced in the second stator coil after the first voltage is induced;
   determining a speed of the rotor based on a difference between the first time and the second time;
   applying current through the second stator coil a predetermined period after the second time; and
   determining the predetermined period based on the speed of the rotor.

15. The method of claim 14, wherein the motor is a two-phase brushless direct current motor.

16. The method of claim 14, further comprising:
   determining the first voltage is induced in the first stator coil when a voltage across the first stator coil is less than or equal to a first predetermined voltage; and
   determining the second voltage is induced in the second stator coil when a voltage across the second stator coil is less than or equal to a second predetermined voltage.

17. The method of claim 14, wherein determining the predetermined period further comprises determining the predetermined period based on a predefined speed.

18. The method of claim 17, further comprising increasing a length of the predetermined period to decrease the speed of the rotor when the predefined speed is less than the speed of the rotor.

19. The method of claim 17, further comprising decreasing a length of the predetermined period to increase the speed of the rotor when the predefined speed is greater than the speed of the rotor.

20. The method of claim 14, further comprising:
   setting the predetermined period equal to zero;
   wherein applying current through the second stator coil comprises applying current through the second stator coil at the second time.

21. The method of claim 14, further comprising stopping current through the second stator coil in response to a third voltage that is induced in the first coil after applying current through the second stator coil.

22. The method of claim 21, further comprising determining an updated speed of the rotor based on a period between the second time and when the third voltage is induced in the first coil.

23. The method of claim 22, further comprising applying current through the first coil an updated period after the third voltage is induced, wherein the updated period is based on the updated speed of the rotor.

24. The method of claim 23, further comprising stopping current through the first coil in response to a fourth voltage that is induced in the second coil after applying current through the first coil.

25. The method of claim 14, further comprising applying current through the first stator coil during the predetermined period to rotate the rotor.

26. The method of claim 25, wherein applying current through the first stator coil during the predetermined period to rotate the rotor comprises applying current through the first stator coil during the predetermined period to maintain the speed of the rotor.

\* \* \* \* \*